US 7,129,684 B2

(12) United States Patent
Park

(10) Patent No.: US 7,129,684 B2
(45) Date of Patent: Oct. 31, 2006

(54) VARIABLE START-UP CIRCUIT FOR SWITCHING REGULATORS

(75) Inventor: Sangbeom Park, Tracy, CA (US)

(73) Assignee: ANA Semiconductor, Tracy, CA (US)

( * ) Notice: Subject to any disclaimer, the term of this patent is extended or adjusted under 35 U.S.C. 154(b) by 73 days.

(21) Appl. No.: 11/032,837

(22) Filed: Jan. 10, 2005

(65) Prior Publication Data

US 2006/0152953 A1    Jul. 13, 2006

(51) Int. Cl.
*G05F 1/618*    (2006.01)

(52) U.S. Cl. .................... 323/282; 323/222

(58) Field of Classification Search .......... 323/222, 323/282, 284–288, 210, 224; 363/124, 17, 363/56, 16, 65; 330/272, 276, 254, 296
See application file for complete search history.

(56) References Cited

U.S. PATENT DOCUMENTS 5,367,247 A * 11/1994 Blocher et al. ............. 323/222
6,969,978 B1 * 11/2005 Dening ...................... 323/282
6,975,047 B1 * 12/2005 Pippin ........................ 307/117

* cited by examiner

*Primary Examiner*—Rajnikant B. Patel

(57) ABSTRACT

The variable start-up circuits basically include a sensor, triggering transistors, current mirror, current source, an N-bit triggering circuit array, and a feedback line. If the sensing voltage does not reach the expected voltage compared to the midpoint voltage of the sensor, the output voltage of the sensor turns on the triggering transistors, which provide a total current to its output through the current mirror until the voltage at feedback reaches the midpoint voltage. The time to reach the midpoint voltage at a load is simply equal to the charge stored at the load divided by the total current, which is controlled by an N-bit digital input and a device aspect ratio of each triggering transistor. Consequently, all variable start-up circuits provide an output voltage level closer to the output voltage level that reaches the equilibrium according to schedule.

20 Claims, 7 Drawing Sheets

VARIABLE START-UP CIRCUIT FOR SWITCHING REGULATORS

FIELD OF THE INVENTION

The present invention relates to the field of variable start-up circuit and more particularly to variable start-up circuit for switching regulators.

BACKGROUND ART

Switching regulator is a vitally important device. Switching regulators are building blocks used extensively in power systems, industry, motor, communication, networks, digital systems, consumer electronics, computers, and any other fields that high efficient voltage regulating functions.

Switching regulators (i.e., DC-TO-DC converters) can provide output voltages which can be less than, greater than, or of opposite polarity to the input voltage. Prior Art FIG. 1 illustrates a basic architecture of a conventional switching regulator 100. The conventional switching regulator 100 basically consists of an oscillator, a reference circuit 102, an error amplifier, a modulator including a comparator, resistors, and a control logic circuit. Control technique of switching regulators has typically used two modulators: a pulse-width modulator and a pulse-frequency modulator. The output DC level is sensed through the feedback loop including two resistors. An error amplifier compares two input voltages: the sampled output voltage and the reference voltage. The output of the error amplifier is compared against a periodic ramp generated by the saw tooth oscillator. The pulse-width modulator output passes through the control logic to the power switch. The feedback system regulates the current transfer to maintain a constant output voltage within the load limits. In other words, it insures that the output voltage level reaches the equilibrium. However, it takes a vast amount of time until the output voltage level reaches the equilibrium from an initial condition after the system starts. When the output voltage level reaches the equilibrium, $V_F$ is equal to $V_{REF}$, as shown in Prior Art FIG. 1.

Since a power supply of a core processor is connected to one of the outputs of switching regulators in most system applications, even the core processor should stand by to operate until it receives the expected output voltage level from the switching regulator. Therefore, power and time are consumed until the switching regulator's output voltage level reaches the equilibrium. In most switching regulator applications, it is highly desirable to control all of the switching regulators on a chip to start differently according to power sequence such as core-up-first and core-down-last or enable all of the switching regulators' output voltage levels to reach the equilibrium immediately for much higher power efficiency. In addition, the conventional switching regulator 100 has taken a long time to be simulated and verified before they are fabricated since the simulation time in designing the conventional switching regulator is absolutely proportional to time to require the switching regulator's output voltage level to reach the equilibrium. Hence, this long simulation adds additional cost and serious bottleneck to design time-to-market. In other words, the slow start-up of the switching regulator increases design simulation time. For these reasons, the conventional switching regulator 100 of Prior Art FIG. 1 is very inefficient to implement in system-on-chip (SOC) or integrated circuit (IC).

Thus, what is needed is a fast starting-up switching regulator that can be highly efficiently implemented with a drastic improvement in start-up time controllability, performance, time-to-market, power consumption, power and time management, efficiency, cost, and design time. The present invention satisfies these needs by providing five embodiments.

SUMMARY OF THE INVENTION

The present invention provides five types of the variable start-up circuits for switching regulators. The variable start-up circuits simultaneously enable any switching regulator's output voltage level to reach the equilibrium according to schedule. The basic architecture of the variable start-up circuits consists of a sensor, a cascode current mirror, triggering transistors, current source, and a feedback line. An N-bit binary-weighted triggering circuit array is added into four embodiments in order to make the start-up time programmable. The sensor senses a voltage at its input. If the sensing voltage does not reach the expected voltage compared to the midpoint voltage of the sensor, the sensor's output voltage turns on the triggering transistors, which provide a total current to its output through the cascode current mirror until the output voltage reaches the midpoint voltage. The time to reach the midpoint voltage at the load is simply equal to the charge stored at the load divided by the total current, which is programmable.

Consequently, all variable start-up circuits provide a significant reduction in the difference between the initial output voltage level and the expected output voltage level in order to overcome serious drawbacks simultaneously. The variable start-up time of the present invention enables all systems to be managed in terms of power, stand-by time, and start-up time. The present invention provides five different embodiments which achieve a drastic improvement in start-up time controllability, performance, time-to-market, power consumption, power and time management, efficiency, cost, and design time.

BRIEF DESCRIPTION OF THE DRAWINGS

The accompanying drawings, which are incorporated in and form a part of this specification, illustrate five embodiments of the invention and, together with the description, serve to explain the principles of the invention.

Prior Art

DESCRIPTION OF THE PREFERRED EMBODIMENTS

In the following detailed description of the present invention, five types of the variable start-up circuits, numerous specific details are set forth in order to provide a through understanding of the present invention. However, it will be obvious to one skilled in the art that the present invention may be practiced without these specific details. In other instances, well known methods, procedures, CMOS digital gates, components, and metal-oxide-semiconductor field-effect transistor (MOSFET) device physics have not been described in detail so as not to unnecessarily obscure aspects of the present invention.

Figure 1:
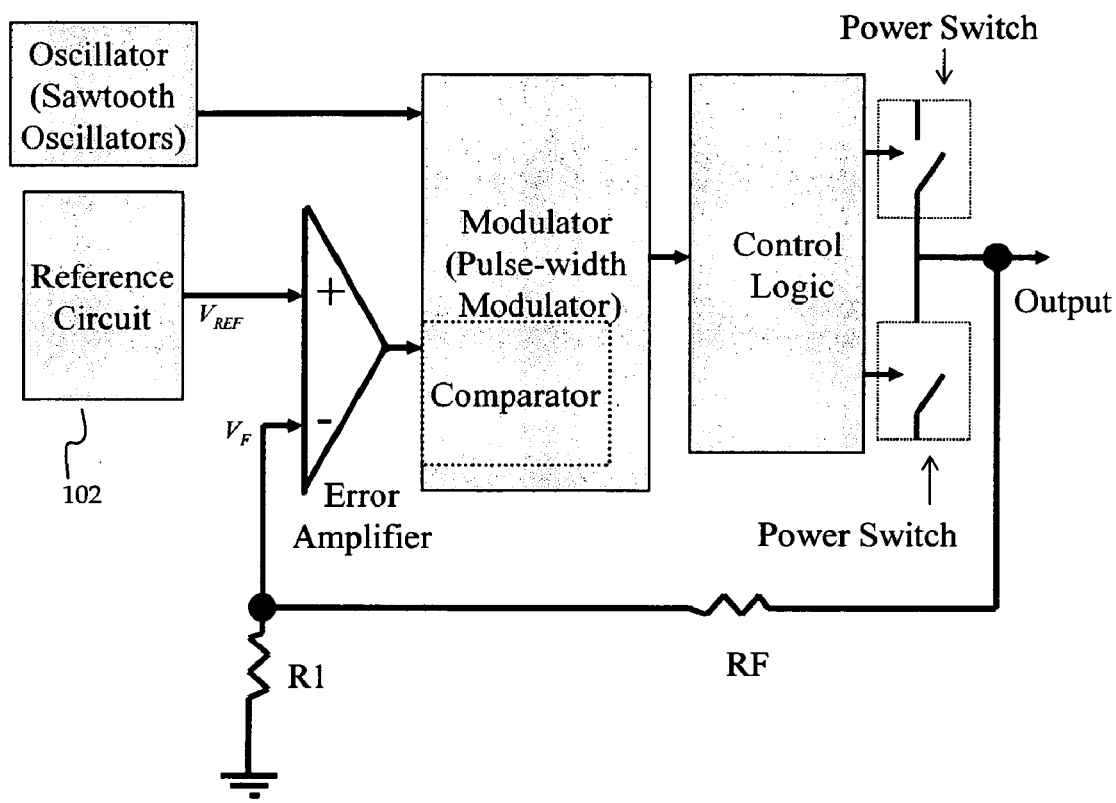
FIG. 1 illustrates a block diagram of a conventional switching regulator (i.e., DC-TO-DC converter).
Figure 2:
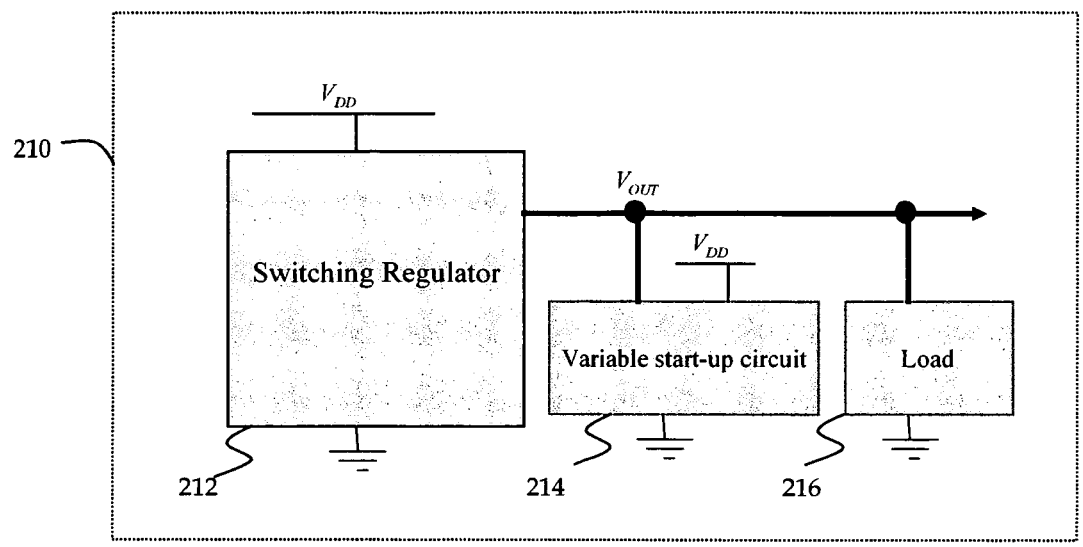
FIG. 2 illustrates a block diagram of two types of variable start-up circuits for switching regulator in accordance with the present invention.
Figure 2:
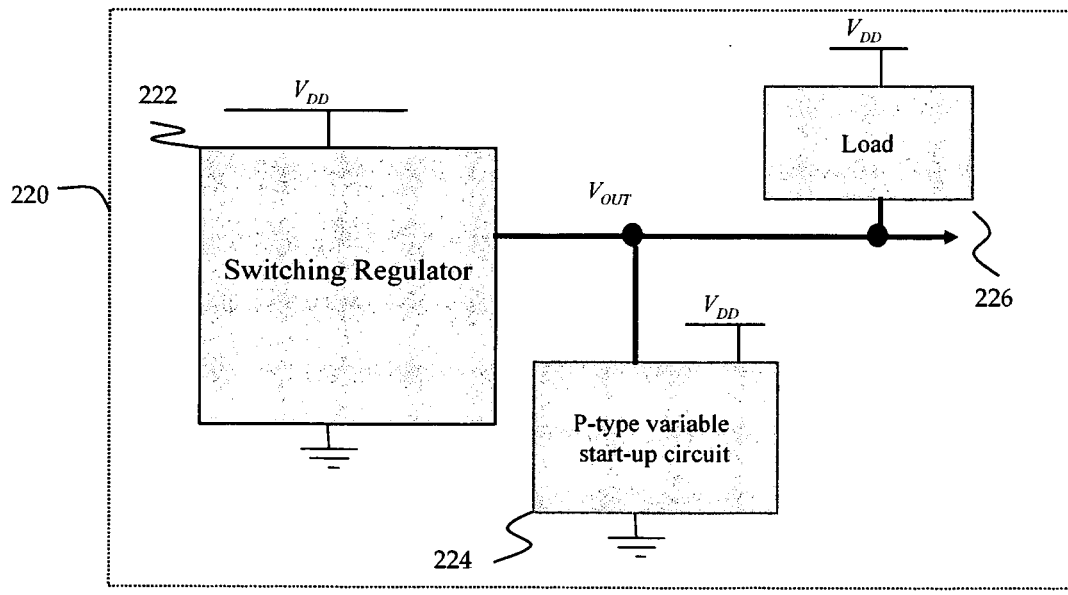

FIG. 2 illustrates two types of the variable start-up circuits for switching regulators in accordance with the present invention. One type of the variable start-up circuit is applied for switching regulators driving a load 216 connected between $V_{OUT}$ and ground, as seen in the switching regulator system 210 shown in FIG. 2. The other type of the variable start-up circuit called "p-type variable start-up circuit" is applied for switching regulators driving a load 226 connected between $V_{DD}$ and $V_{OUT}$, as seen in the switching regulator system 220 shown in FIG. 2. To reduce the difference between the initial output voltage level and the expected output voltage level of the switching regulator, the output of all the variable start-up circuits is coupled to the output terminal of switching regulators, as shown in FIG. 2. The switching regulator 212 represents all types of the switching regulators (i.e., DC-TO-DC converter) driving a load 216 connected between $V_{OUT}$ and ground without regard to the types of switching regulators because the applications of the variable start-up circuit 214 is independent of architectures and types of switching regulators. The switching regulator 222 represents all types of the switching regulators (i.e., DC-TO-DC converter) driving a load 226 connected between $V_{DD}$ and $V_{OUT}$ without regard to the types of switching regulators because the applications of the p-type variable start-up circuit 224 is independent of architectures and types of switching regulators.

Figure 3:
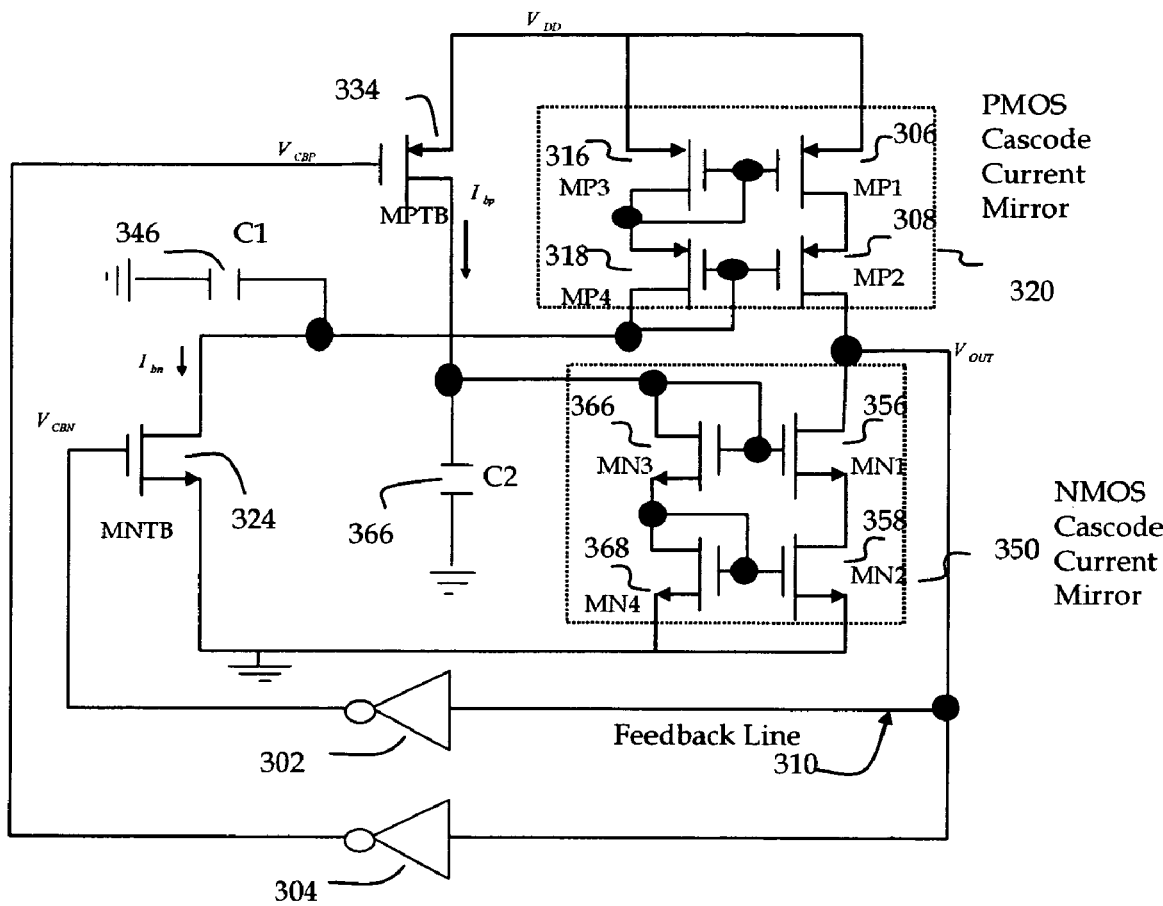
FIG. 3 illustrates a circuit diagram of a dual variable start-up circuit according to the present invention.

FIG. 3 illustrates a circuit diagram of a dual variable start-up circuit according to the present invention. This dual variable start-up circuit 300 of the invention does not have both power-down mode and N-bit binary-weighted triggering circuit array in order to show the fundamental concept of the invention clearly. In practice, the dual variable start-up circuit 300 is a feedback circuit that consists of a lower voltage sensing inverter 302 (i.e., an odd number of inverters), a triggering NMOS transistor 324, a PMOS cascode current mirror 320, a higher voltage sensing inverter 304 (i.e., an odd number of sensing inverters), a triggering PMOS transistor 334, a NMOS cascode current mirror 350, two capacitors 346 and 366 and a feedback line 310.

The lower-voltage sensing inverter 302 senses a voltage assuming the output of the dual variable start-up circuit 300 is at ground. Since the lower-voltage sensing inverter 302 initially senses the voltage less than the midpoint voltage of the lower-voltage sensing inverter, the output voltage of the lower-voltage sensing inverter 302 is high enough to turn on the triggering NMOS transistor 324. At the same time, the output voltage of the higher-voltage sensing inverter 304 is high enough to turn off the triggering PMOS transistor 334. Thus, the only triggering NMOS transistor 324 provides a NMOS current, $I_{bn}$, to the output through the PMOS cascode current mirror 320 until the output voltage, $V_{OUT}$ goes up to the midpoint voltage, which is decided by the device aspect ratios of the lower-voltage sensing inverter 302. The time to reach the midpoint voltage at the load connected between $V_{OUT}$ and ground is simply equal to the charge stored at the load divided by the current. If the load is multiple-order circuit, then it will be approximated to the first-order load. At the same time, all resistors and inductors in the load are assumed to be neglected for simplicity. Thus, the time to reach the midpoint voltage is as follows:

$$\Delta t = \frac{V_M C_P}{I_{bn}}$$

where $V_M$ is the midpoint voltage determined by the device aspect ratios of the lower-voltage sensing inverter 302 and $C_P$ is the value of the capacitor in the load. Also, assuming that $V_M$ is closer to the output voltage level that reaches the equilibrium in switching regulators, the start-up time of the switching regulators is approximately given by $$\frac{V_M C_P}{I_{bn}}$$

This start-up time varies depending on the device aspect ratio of the triggering NMOS transistor 324.

Likewise, the higher-voltage sensing inverter 304 senses a voltage assuming the output of the dual variable start-up circuit 300 is at power supply. Since the higher-voltage sensing inverter 304 initially senses the voltage greater than the higher midpoint voltage of the higher-voltage sensing inverter 304, the output voltage of the higher-voltage sensing inverter 304 is low enough to turn on the triggering PMOS transistor 334. At the same time, the output voltage of the lower-voltage sensing inverter 302 is low enough to turn off the triggering NMOS transistor 324. Thus, the only triggering PMOS transistor 334 provides a PMOS current, $I_{bp}$, to the output through the NMOS cascode current mirror 350 until the output voltage, $V_{OUT}$ goes down to the higher midpoint voltage, which is decided by the device aspect ratios of the higher-voltage sensing inverter 304. The time to reach the midpoint voltage at the load connected between $V_{OUT}$ and power supply is simply equal to the charge stored at the load divided by the current. If the load is multiple-order circuit, then it will be approximated to the first-order load. At the same time, all resistors and inductors in the load are assumed to be neglected for simplicity. Thus, the time to reach the higher midpoint voltage is as follows:

$$\Delta t = \frac{(V_{DD} - V_{M(H)})C_P}{I_{bp}}$$

where $V_{M(H)}$ is the higher midpoint voltage determined by the device aspect ratios of the higher-voltage sensing inverter 304 and $C_P$ is the value of the capacitor in the load. Also, assuming that $V_{M(H)}$ is closer to the output voltage level that reaches the equilibrium in switching regulators, the start-up time of the switching regulators is approximately given by $$\frac{(V_{DD} - V_{M(H)})C_P}{I_{bp}}$$

This start-up time varies depending on the device aspect ratio of the triggering PMOS transistor 334.

The midpoint voltage is a voltage where the input voltage and the output voltage of the inverter are equal in the voltage transfer characteristic.

At the midpoint voltage, the transistors of the inverter operate in the saturation mode. This midpoint voltage of inverter is expressed as $$\frac{V_{DD} - V_{T_n} - |V_{T_p}|}{1 + \sqrt{\frac{K_n}{K_p}}} + V_{T_n} \text{ where}$$

$$\frac{K_n}{K_p} = \frac{\mu_n C_{OX}\left(\frac{W}{L}\right)_n}{\mu_p C_{OX}\left(\frac{W}{L}\right)_p}$$

In addition, the capacitor 346 and capacitor 366 are added to the drains of the triggering NMOS transistor 324 and triggering PMOS transistor 334, respectively to attenuate glitches since they provide additional paths to ground. More additional capacitors can be optionally added to necessary nodes in FIG. 3 to attenuate glitches.

In design of the dual variable start-up circuit of FIG. 3, it is also desirable to use a value for the midpoint voltage, $V_M$, less than $V'_{OUT}$ and a value for the higher midpoint voltage, $V_{M(H)}$, greater than $V'_{OUT}$. $V'_{OUT}$ is the output voltage level that reaches the equilibrium in switching regulators. The CMOS process variations usually must be considered so that the proper value of the midpoint voltage is chosen for the dual variable start-up circuit of FIG. 3. In addition, each bulk of four PMOS transistors in the cascode current mirror 320 can be connected to its own N-well to obtain better immunity from substrate noise.

Figure 4:
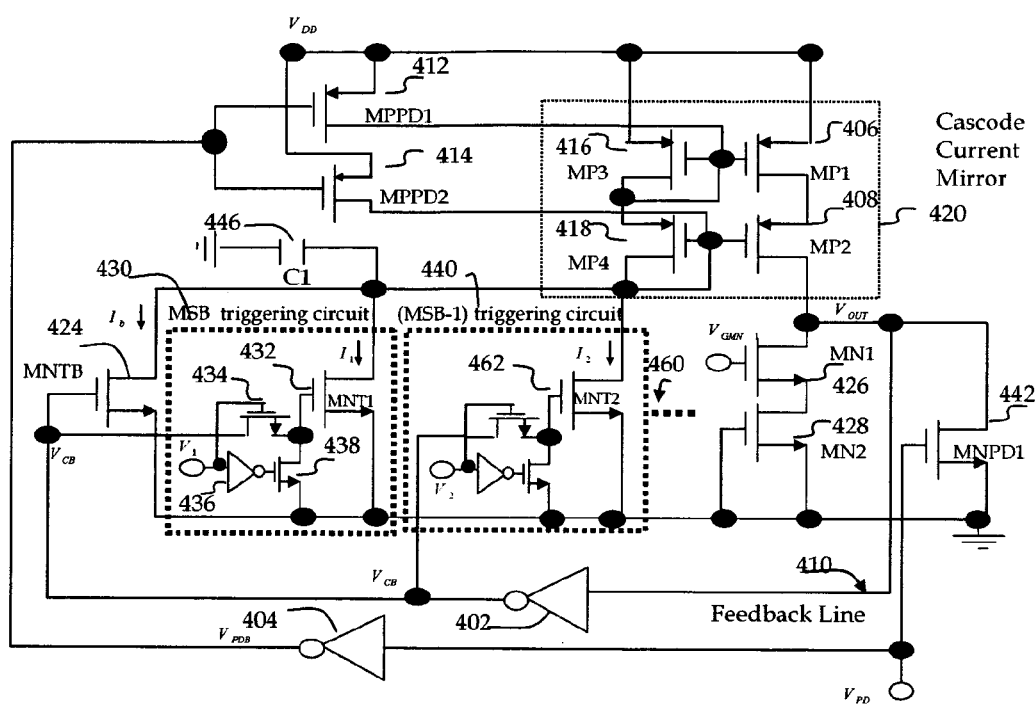
FIG. 4 illustrates a circuit diagram of an N-bit variable start-up circuit in accordance with the present invention.

FIG. 4 illustrates a circuit diagram of an N-bit variable start-up circuit 400 according to the present invention. A power-down input voltage, $V_{PD}$, is defined as the input voltage for power down mode. The power-down enable system is in power down mode when $V_{PD}$ is $V_{DD}$ and it is in normal mode when $V_{PD}$ is zero. In practice, the N-bit variable start-up circuit 400 is a feedback circuit that consists of a sensing inverter 402 (i.e., an odd number of inverters), a base triggering NMOS transistor 424, a cascode current mirror 420, NMOS transistor current source 426 and 428, two triggering circuits 430 and 440 including triggering NMOS transistors 432 and 462, (N−2) triggering circuits 460, a capacitor 446, and a feedback line 410 with following power-down devices: a power-down inverter 404, two power-down PMOS transistors 412 and 414, and a power-down NMOS transistor 442. In addition, in the NMOS transistor current source, the gate terminal of a NMOS transistor 428 is shorted and the gate of a NMOS transistor 426 is connected to a proper fixed-bias voltage (not shown) or a power supply voltage (e.g., $V_{DD}$, "1", high, etc.). Thus, no current flows into the drains of the NMOS transistors 426 and 428. Especially in the cascode current mirror 420, the transistors MP3 416 and MP4 418 are diode-connected transistors. Two triggering circuits 430 and 440 are shown in FIG. 4 while the dotted lines 460 represent (N−2) triggering circuits (not shown), where N is a predetermined bit length. So, there are totally N triggering circuits since two added (N−2) makes N. N=0 indicates that there is no binary-weighted triggering circuit array in FIG. 4. N=1 indicates that there is only MSB triggering circuit 430 in FIG. 4. N=2 indicates that there are two triggering circuits 430 and 440 in FIG. 4. As seen in the triggering circuits 430 and 440 shown in FIG. 4, triggering NMOS transistors 432 and 462 share the drain terminal with the base triggering NMOS transistor 424 so that currents are added.

The sensing inverter 402 senses a voltage at its input when the circuit mode changes from power-down mode to normal mode after its start-up. Since the sensing inverter 402 initially senses the input voltage less than the midpoint voltage of the sensing inverter 402, the output voltage of the sensing inverter 402 is high enough to turn on the base triggering NMOS transistor 424. In other words, $V_{CB}$ becomes $V_{DD}$ (e.g., power supply voltage, "1", high, etc.) to turn on the base triggering NMOS transistor 424. However, a control input high with $V_{CB}=V_{DD}$ turns on the corresponding triggering NMOS transistor in the binary-weighted triggering circuit array. The N-bit binary-weighted triggering circuit array with the base triggering NMOS transistor generates a total current provided to the output through the cascode current mirror 420 until the output voltage, $V_{OUT}$, goes up to the midpoint voltage, which is decided by the device aspect ratios of the sensing inverter 402. Each amount of current is decided by scaling the device aspect ratio of each triggering NMOS transistor. $I_1$ through $I_n$ would be controlled by the binary bit coefficients associated with an N-bit digital input signal. Hence, the total current, $I_{TOTAL}$, corresponding to an N-bit digital input is given as follows:

$$I_{TOTAL} = I_b + (b_1 I_1) + (b_2 I_2) + (b_3 I_3) \ldots + (b_n I_n)$$

where $b_1, b_2, \ldots, b_n$ are the binary bit coefficients having a value of either a "1" or "0". The binary coefficient $b_1$ represents the most significant bit (i.e., MSB) while $b_n$ represents the least significant bit (i.e., LSB). For instance, the binary bit coefficient $b_1$ is 1 if $V_1$ is high. Furthermore, the time to reach the midpoint voltage at the load is simply equal to the charge stored at the load divided by the total current. If the load is multiple-order circuit, then it will be approximated to the first-order circuit. At the same time, all resistors and inductors in load are assumed to be neglected for simplicity. Thus, the time to reach the midpoint voltage, corresponding to an N-bit digital input is as follows:

$$\Delta t = \frac{V_M C_P}{I_b + (b_1 I_1) + (b_2 I_2) + (b_3 I_3) \ldots + (b_n I_n)}$$

where $V_M$ is the midpoint voltage determined by the device aspect ratios of the sensing inverter 402 and $C_P$ is the value of the capacitor in the load connected between $V_{OUT}$ and ground. It is assumed that any multiple-order load is approximated to the first-order load with neglecting all resistors and inductors in the load for simplicity. Also, assuming that $V_M$ is closer to the output voltage level that reaches the equilibrium in switching regulators, the start-up time of the switching regulators is approximately given by $$\frac{V_M C_P}{I_b + (b_1 I_1) + (b_2 I_2) + (b_3 I_3) \ldots + (b_n I_n)}$$

It is noted that the start-up time is programmable by an N-bit digital input.

As seen in the MSB triggering circuit 430, it is also noted that each triggering circuit is comprised of a triggering NMOS transistor, two NMOS switches (or CNOS switches), and an inverter. Two NMOS (or CMOS) switches 434 and 438 are coupled to the gate terminal of the triggering NMOS transistor 432 in order to turn completely off the triggering NMOS transistor 432. In particular, the gate of the NMOS (or CMOS) switch 438 is controlled by the inverting control input, $\overline{V}_1$, through an inverter 436 while the gate of the NMOS (or CMOS) switch 434 is controlled by the non-inverting control input, $V_1$. In addition, the capacitor 446 is added to the drain of the triggering NMOS transistors to attenuate glitches since it provides additional paths to ground. More additional capacitors can be optionally added to necessary nodes in FIG. 4 to attenuate glitches.

In design of the N-bit variable start-up circuit of FIG. 4, it is also desirable to use a value for the midpoint voltage, $V_M$, less than the output voltage level that reaches the equilibrium in switching regulators. The CMOS process variations usually must be considered so that the proper value of the midpoint voltage is chosen for the N-bit variable start-up circuit of FIG. 4. In addition, each bulk of four PMOS transistors in the current mirror 420 can be connected to its own N-well to obtain better immunity from substrate noise. It is desirable to use the N-bit variable start-up circuit 400 for all types of the switching regulators (i.e., DC-TO-DC converters) driving the load 216 connected between $V_{OUT}$ and ground.

Since the power-down input voltage, $V_{PD}$, becomes $V_{DD}$ for power-down mode, the power-down NMOS transistor 442 is on during power-down mode and thus provides an output pull-down path to ground. Thus, $V_{OUT}$ of the N-bit variable start-up circuit 400 is zero during power-down mode. Zero dc volt at $V_{OUT}$ ensures that no current flows into the circuits during power-down mode.

Figure 5:
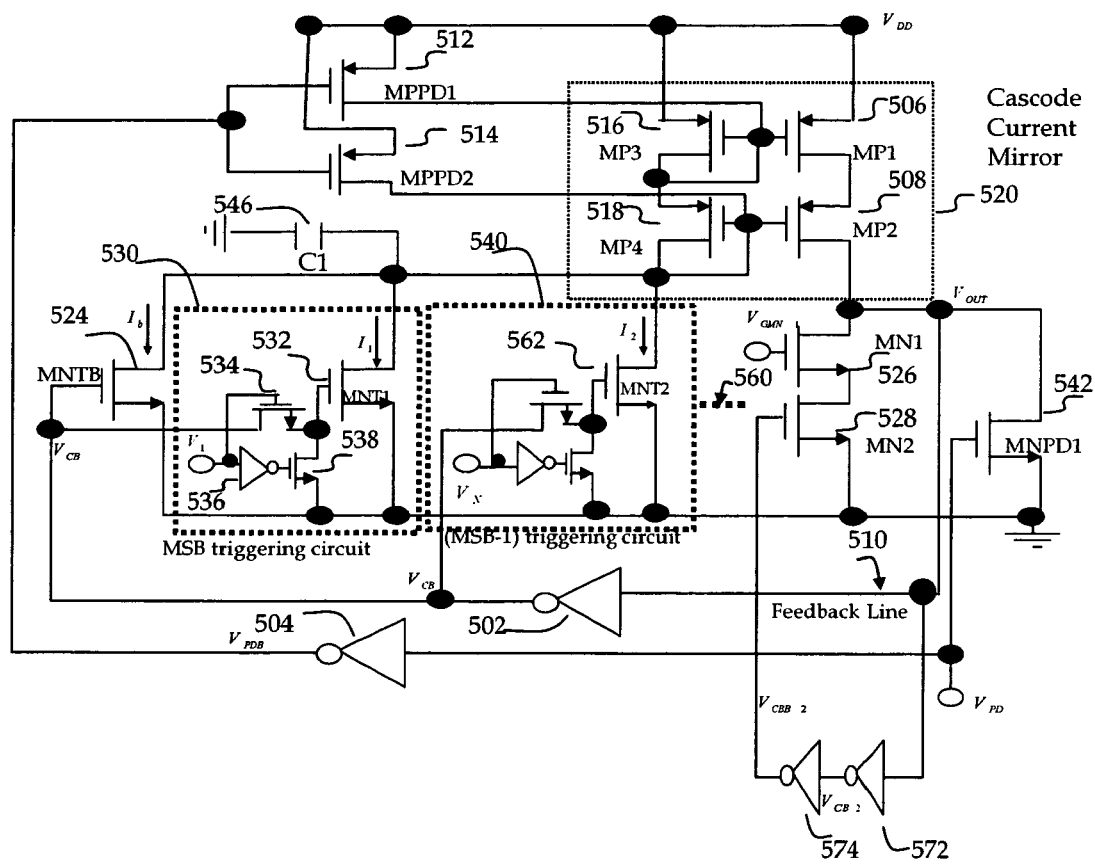
FIG. 5 illustrates a circuit diagram of an N-bit dual variable start-up circuit according to the present invention.

FIG. 5 illustrates a circuit diagram of an N-bit dual variable start-up circuit 500 in accordance with the present invention. The N-bit dual variable start-up circuit 500 is a modification of the circuit described in FIG. 4. As shown in FIG. 5, it is noted that the gate terminal of a NMOS transistor 528 is connected to the output of the second higher-voltage sensing inverter 574 and the gate of a NMOS transistor 526 is connected to a proper fixed-bias voltage (not shown) or a power supply voltage (e.g., $V_{DD}$, "1", high, etc.).

The first difference to note here is that the gate of the NMOS transistor 528 is not shorted in FIG. 5 while the gate terminal of a NMOS transistor 428 is shorted in the NMOS transistor current source in FIG. 4. Also, the higher-voltage sensing inverters 572 and 574 (i.e., an even number of inverters) are added into FIG. 5 in order to provide the higher-voltage sensing function. The N-bit dual variable start-up circuit 500 is able to sense the lower-voltage as well as the higher-voltage. But it is noted that the N-bit variable start-up circuit 400 is able to sense only the lower-voltage.

No current flows into the drains of the NMOS transistors 526 and 528 assuming $V_{OUT} < V_{M(H)}$ where $V_{M(H)}$ is the higher midpoint voltage decided by the device aspect ratios of the first higher-voltage sensing inverter 572. If $V_{OUT}$ is greater than $V_{M(H)}$, the output voltage of the first higher-voltage sensing inverter 572 is low and thus the output voltage of the second higher-voltage sensing inverter 574 is $V_{DD}$. Therefore, the NMOS transistor 528 is on and thus a constant current flows into the drains of the NMOS transistors 526 and 528 until $V_{OUT}$ goes down to $V_{M(H)}$. In this case, the constant current is not programmable and an amount of the constant current depends on device aspect ratio of the NMOS transistor 528.

In design of the N-bit dual variable start-up circuit of FIG. 5, it is also desirable to use a value for the midpoint voltage, $V_M$, less than $V'_{OUT}$ and a value for the higher midpoint voltage, $V_{M(H)}$, greater than $V'_{OUT}$. $V'_{OUT}$ is the output voltage level that reaches the equilibrium in switching regulators. $V_M$ is the midpoint voltage decided by the device aspect ratios of the lower-voltage sensing inverter 502.

It is desirable to use the N-bit dual variable start-up circuit 500 for all types of the switching regulators (i.e., DC-TO-DC converters) driving the load 216 connected between $V_{OUT}$ and ground. The operations and principles of power down mode shown in FIG. 5 are the same as those of the circuit shown in FIG. 4. Zero dc volt at $V_{OUT}$ ensures that no current flows into the circuits during power-down mode. The N-bit dual variable start-up circuit of the present invention offers dual sensing capability by simply adding two more inverters (i.e., an even number of inverters) and connecting the gate of NMOS transistor 528 to the output of the second higher-voltage sensing inverter 574.

Figure 6:
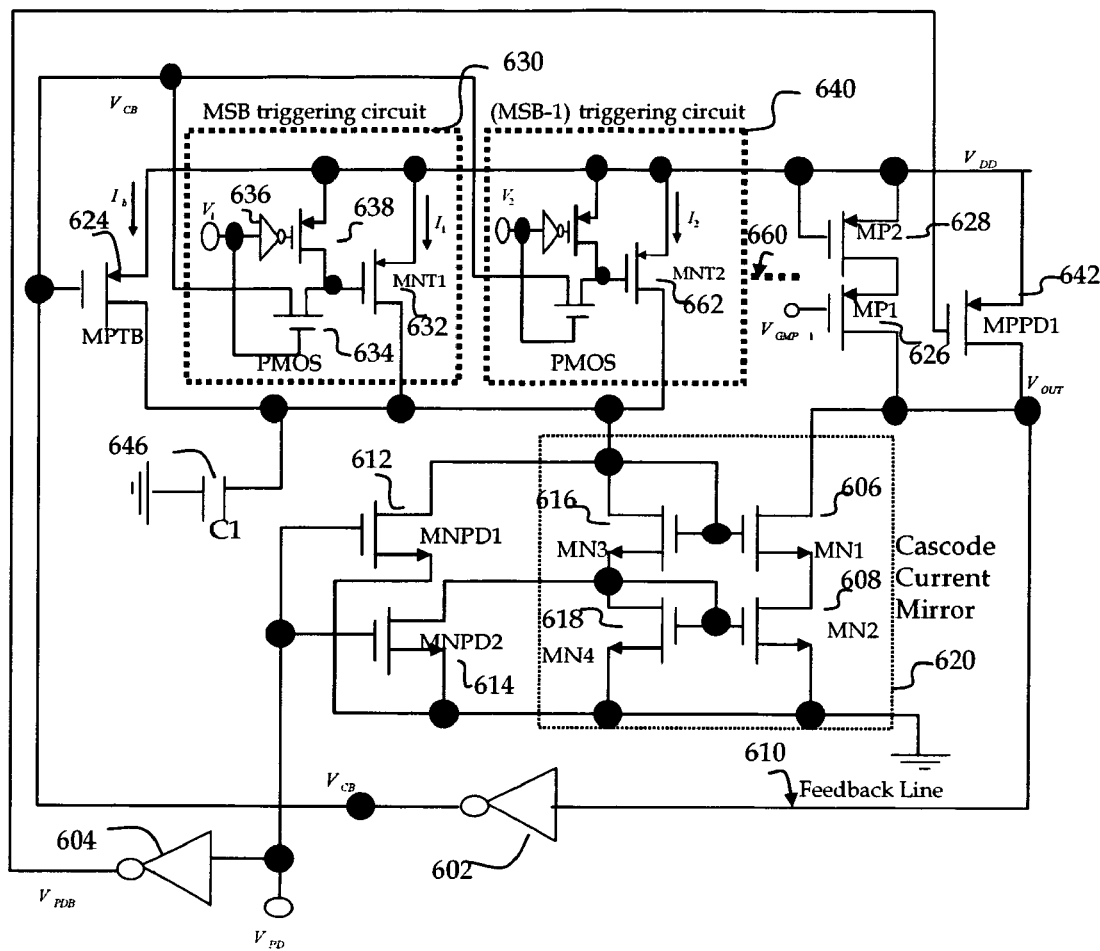
FIG. 6 illustrates a circuit diagram of an N-bit p-type variable start-up circuit in accordance with the present invention.

FIG. 6 illustrates a circuit diagram of an N-bit p-type variable start-up circuit 600 according to the present invention. The power-down input voltage, $V_{PD}$, is defined as the input voltage for the p-type power down mode as well as for the power down mode. In addition, p-type power down mode can also be termed the power-down mode, too. The p-type power-down enable system is in power down mode when $V_{PD}$ is $V_{DD}$ and it is in normal mode when $V_{PD}$ is zero. In practice, the N-bit p-type variable start-up circuit 600 is a feedback circuit that consists of a higher-voltage sensing inverter 602 (i.e., an odd number of inverters), a base triggering PMOS transistor 624, a cascode current mirror 620, PMOS transistor current source 628 and 626, a capacitor 646, two triggering circuits 630 and 640, (N−2) triggering circuits 660, and a feedback line 610 with following power-down devices: a power-down inverter 604, two power-down NMOS transistors 612 and 614, and a power-down PMOS transistor 642. In addition, it is noted that the gate terminal of a PMOS transistor 628 is connected to a power supply voltage (e.g., $V_{DD}$, "1", high, etc.) and the gate of a PMOS transistor 626 is connected to a proper fixed-bias voltage (not shown) or ground (e.g., "0", low, etc.). Since the PMOS transistor 628 is turned off, no current flows out of the drains of the PMOS transistors 628 and 626. Also, $V_{M(H)}$ is the higher midpoint voltage decided by the device aspect ratios of the higher-voltage sensing inverter 602. Also, in the cascode current mirror 620 shown in FIG. 6, the transistors MN3 616 and MN4 618 are diode-connected transistors. Two triggering circuits 630 and 640 are shown in FIG. 6 while the dotted lines 660 represent (N−2) triggering circuits (not shown), where N is a predetermined bit length. So, there are totally N triggering circuits since two added (N−2) makes N. N=0 indicates that there is no binary-weighted triggering circuit array in FIG. 6. N=1 indicates that there is only MSB triggering circuit 630 in FIG. 6. N=2 indicates there are two triggering circuits 630 and 640 in FIG. 6.

The higher-voltage sensing inverter 602 senses a voltage at its input when the circuit mode changes from p-type power-down mode to normal mode after its start-up. Since the higher-voltage sensing inverter 602 initially senses $V_{DD}$, which is greater than the higher midpoint voltage, $V_{M(H)}$, of the higher-voltage sensing inverter, the output voltage of the higher-voltage sensing inverter 602 is low enough to turn on the base triggering PMOS transistors 624. In other words, $V_{CB}$ becomes zero (e.g., ground, "0", low, etc.) to turn on the base triggering PMOS transistors 624. However, a control input low with $V_{CB}$=0 turns on the corresponding triggering PMOS transistor in the binary-weighted triggering circuit array. The binary-weighted triggering circuit array with the base triggering PMOS transistor generates a total current provided to the output through the cascode current mirror 620 until the output voltage, $V_{OUT}$, goes down to the higher midpoint voltage, $V_{M(H)}$, which is decided by the device aspect ratios of the higher-voltage sensing inverter 602. Each amount of current is decided by scaling the device aspect ratio of each triggering PMOS transistor. $I_1$ through $I_n$ would be controlled by the binary bit coefficients associated with an N-bit digital input signal. Hence, the N-bit p-type variable start-up circuit 600 provides the total current as follows:

$$I_{TOTAL}=I_b+(b_1 I_1)+(b_2 I_2)+(b_3 I_3) \ldots +(b_n I_n)$$

$C_P$ is the value of the capacitor in the load connected between $V_{OUT}$ and power supply. For example, the binary bit coefficient $b_1$ is 1 if $V_1$ is low. It is assumed that any multiple-order load is approximated to the first-order load with neglecting all resistors and inductors in the load for simplicity. Also, assuming that $V_{M(H)}$ is closer to the output voltage level that reaches the equilibrium in switching regulators, the start-up time of the switching regulators is approximately given by $$\frac{(V_{DD} - V_{M(H)})C_P}{I_b + (b_1 I_1) + (b_2 I_2) + (b_3 I_3) \ldots + (b_n I_n)}$$

It is noted that the start-up time is programmable by an N-bit digital input.

As seen in the MSB triggering circuit 630, it is also noted that each triggering circuit is comprised of a triggering PMOS transistor, two PMOS switches (or CNOS switches), and an inverter. In addition, the capacitor 646 is added to the drain of the triggering PMOS transistors to attenuate glitches since it provides additional paths to ground. More additional capacitors can be optionally added to necessary nodes shown in FIG. 6 to attenuate glitches.

In design of the N-bit p-type variable start-up circuit of FIG. 6, it is also desirable to use a value for the higher midpoint voltage, $V_{M(H)}$, greater than the output voltage level that reaches the equilibrium in switching regulators. The CMOS process variations usually must be considered so that the proper value of the midpoint voltage is chosen for the N-bit p-type variable start-up circuit of FIG. 6. In addition, each bulk of four PMOS transistors in the current mirror 620 can be connected to its own N-well to obtain better immunity from substrate noise. It is desirable to use the N-bit p-type variable start-up circuit 600 for all types of the switching regulators (i.e., DC-TO-DC converters) driving the load 226 connected between $V_{OUT}$ and power supply.

If $V_{PD}$ becomes $V_{DD}$ during p-type power-down mode, the output voltage of the power-down inverter, $V_{PDB}$, is zero, which turns on the power-down PMOS transistor 642 during power-down mode and thus provides an output pull-up path to $V_{DD}$. Therefore, the $V_{OUT}$ of the N-bit p-type variable start-up circuit 600 is $V_{DD}$. $V_{OUT}$=$V_{DD}$ ensures that no current flows into the circuits during power-down mode. On the contrary, it was stated earlier that $V_{OUT}$ must be zero when power-down mode occurs in FIG. 4 and FIG. 5.

Figure 7:
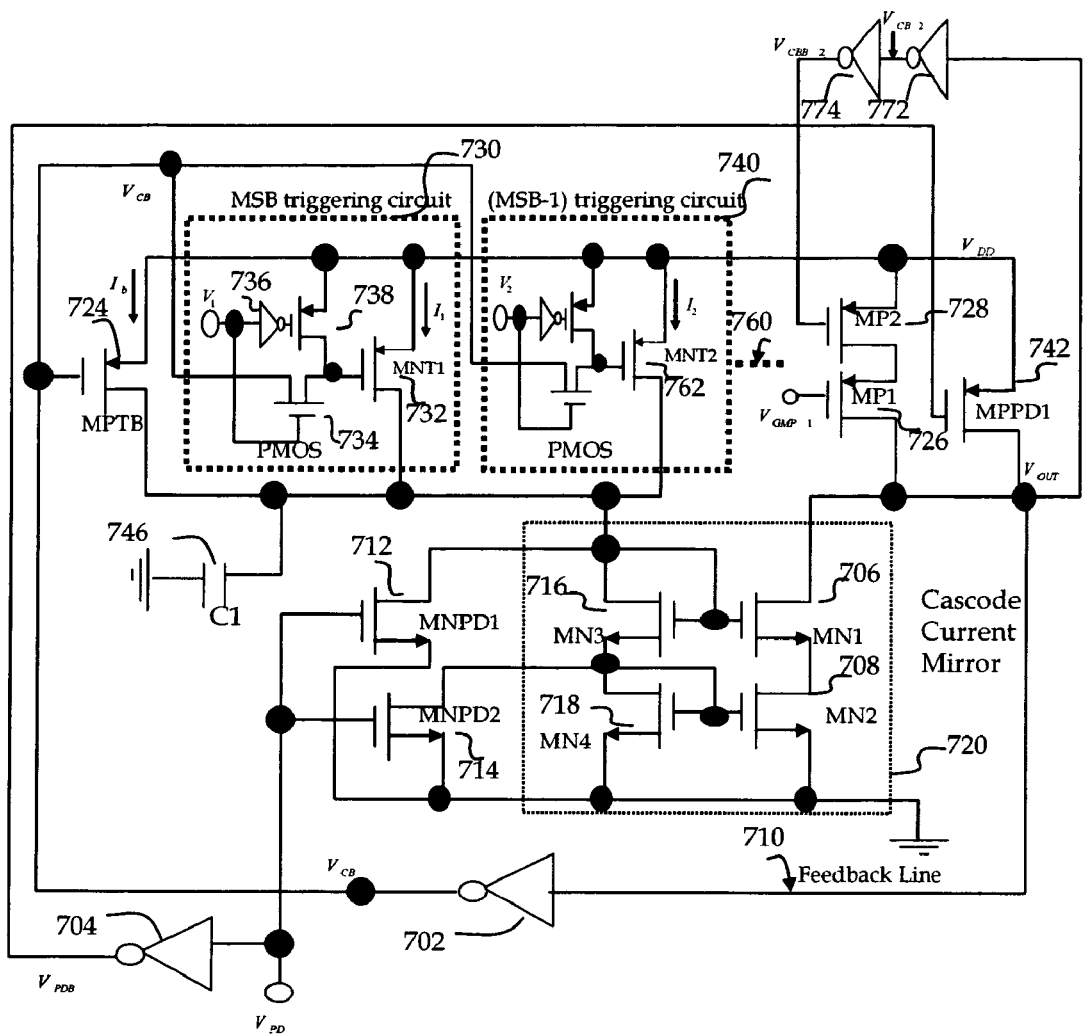
FIG. 7 illustrates a circuit diagram of an N-bit p-type dual variable start-up circuit according to the present invention.

FIG. 7 illustrates a circuit diagram of an N-bit p-type dual variable start-up circuit 700 in accordance with the present invention. The p-type power-down mode shown in FIG. 6 is again applied to FIG. 7. The N-bit p-type dual variable start-up circuit 700 is a modification of the circuit described in FIG. 6. As shown in FIG. 7, it is noted that the gate terminal of a PMOS transistor 728 is connected to the output of the second lower-voltage sensing inverter 774 and the gate of a PMOS transistor 726 is connected to a proper fixed-bias voltage (not shown) or ground (e.g., "0", low, etc.). The first difference to note here is that the gate of the PMOS transistor 728 is not off in FIG. 7 while the gate terminal of the PMOS transistor 628 is off in FIG. 6. Also, the lower-voltage sensing inverters 772 and 774 (i.e., an even number of inverters) are added into FIG. 7 in order to sense the lower-voltage. The N-bit p-type dual variable start-up circuit 700 is able to sense the lower-voltage as well as the higher voltage. But it is noted that the N-bit p-type variable start-up circuit 600 is able to sense the higher voltage.

No current flows out of the drains of the PMOS transistors 728 and 726 if $V_{OUT}$ is greater than $V_M$. $V_M$ is the lower midpoint voltage decided by the device aspect ratios of the first lower-voltage sensing inverter 772. If $V_{OUT}$ is smaller than $V_M$, the PMOS transistor 728 is turned on until $V_{OUT}$ goes up to $V_M$. In other words, a constant current flows out of the drains of the PMOS transistors 728 and 726 until $V_{OUT}$ goes up to $V_M$. In this case, the constant current is not programmable and the amount of the constant current depends on device aspect ratio of the PMOS transistor 728.

In design of the N-bit p-type dual variable start-up circuit of FIG. 7, it is also desirable to use a value for the higher midpoint voltage, $V_{M(H)}$, greater than $V'_{OUT}$ and a value for the lower midpoint voltage, $V_M$, smaller than $V'_{OUT}$. $V'_{OUT}$ is the output voltage level that reaches the equilibrium in switching regulators. It is desirable to use the N-bit p-type dual variable start-up circuit 700 for all types of the switching regulators (i.e., DC-TO-DC converters) driving the load 226 connected between $V_{OUT}$ and power supply. $V_{OUT}$=$V_{DD}$ in the N-bit p-type dual variable start-up circuit 700 ensures that no current flows into the circuits during power-down mode.

In summary, the five variable start-up circuits of the present invention within switching regulators control how fast the output voltage level reaches the equilibrium from an initial output voltage level. The dual variable start-up circuit 300 is used in application that does not require any programmability of start-up time. The balance between PMOS output resistance and NMOS output resistance is important since all the variable start-up circuits of the present invention use the cascode current mirror The variable start-up circuit 214 shown in FIG. 2 represents the dual variable start-up circuit 300, the N-bit variable start-up circuit 400, and the N-bit dual variable start-up circuit 500, as shown in FIG. 3, FIG. 4, and FIG. 5, respectively. Also, the p-type variable start-up circuit 224 shown in FIG. 2 represents the dual variable start-up circuit 300, the N-bit p-type variable start-up circuit 600 and the N-bit p-type dual variable start-up circuit 700, as shown in FIG. 3, FIG. 6, and FIG. 7, respectively.

It is noted that SPICE is used for the simulation of switching regulators. The conventional switching regulator 100 and the switching regulator systems 210 including the variable start-up circuit 300 are simulated using the same components. As a result, the total simulation time of the conventional switching regulator 100 is 40 hours and that of the switching regulator systems 210 using the device aspect ratio, $$\left(\frac{W}{L}\right)_{MNTB} = \frac{6u}{1u},$$

of the base triggering NMOS transistor 324 is 3 hours. This improvement can be accomplished by simply inserting a proper one of the variable start-up circuits into any conventional switching regulator, and the simulation time can be reduced by a factor of 13.

All the variable start-up circuits of the present invention are very efficient to implement in system-on-chip (SOC) or integrated circuit (IC). The present invention provides five different embodiments which achieve a drastic improvement in start-up time controllability, performance, time-to-market, power consumption, power and time management, efficiency, cost, and design time. While the present invention has been described in particular embodiments, it should be appreciated that the present invention should not be construed as being limited by such embodiments, but rather construed according to the claims below.

What is claimed is:

1. A variable start-up circuit for enabling the output voltage level to reach the equilibrium in switching regulator according to schedule, comprising:
    a feedback line connected with the output and input of the variable start-up circuit and also coupled to the load;
    a sensor for sensing a voltage at the output, comparing with the midpoint voltage decided by the device aspect ratios of the sensing inverter, and providing its output;
    an N-bit binary-weighted triggering circuit array with the base triggering transistor for generating a total current corresponding to an N-bit digital input and an output of the sensor;
    a current mirror for receiving the total current and providing the total current to the output; and
    a current source coupled to the output.

2. The circuit as recited in claim 1 wherein the sensor is inverter.

3. The circuit as recited in claim 1 wherein the sensor is comparator.

4. The circuit as recited in claim 1 wherein the sensor is operational amplifier.

5. The circuit as recited in claim 1 wherein the sensor is CMOS NAND gate since the two-input CMOS NAND gate can be used as an enabling inverter with one input serving as an active high enable input and the other used as the logical input.

6. The circuit as recited in claim 1 wherein the sensor is CMOS NOR gate since the two-input CMOS NOR gate can be used as an enabling inverter with one input serving as an active low enable input and the other used as the logical input.

7. The circuit as recited in claim 1 wherein an odd number of CMOS sensing inverters control the gates of triggering NMOS transistors coupled to the PMOS transistor current mirror.

8. The circuit as recited in claim 1 wherein an odd number of CMOS sensing inverters control the gates of triggering PMOS transistors coupled to the NMOS transistor current mirror.

9. The circuit as recited in claim 1 wherein an even number of CMOS sensing inverters directly control the gate of NMOS transistor in current source if there are not additional NMOS transistor current mirror and N-bit triggering circuit array including triggering PMOS transistors which are coupled each other.

10. The circuit as recited in claim 1 wherein an even number of CMOS sensing inverters directly control the gate of PMOS transistor in current source if there are not additional PMOS current mirror and N-bit triggering circuit array including triggering NMOS transistors which are coupled each other.

11. The circuit as recited in claim 1 wherein capacitors are added to necessary nodes.

12. The circuit as recited in claim 1 wherein the current mirror is cascode current mirror.

13. The circuit as recited in claim 1 wherein the current mirror is the Wilson current mirror.

14. The circuit as recited in claim 1 wherein the current mirror is simple current mirror.

15. The circuit as recited in claim 1 wherein power-down inverter and power-down transistors are further added to turn off all transistors and CMOS gates so that no current flows into the circuit during power-down mode.

16. The circuit as recited in claim 1 wherein the output of the variable start-up circuit is coupled to a load connected between the output and ground.

17. The circuit as recited in claim 16 wherein the output of the variable start-up circuit is at ground to ensure that no current flows into the circuit when the power-down input is at the power supply.

18. The circuit as recited in claim 1 wherein the output of the variable start-up circuit is coupled to a load connected between the output and power supply.

19. The circuit as recited in claim 18 wherein the output of the variable start-up circuit is at power supply to ensure that no current flows into the circuit when the power-down input is at the power supply.

20. The circuit as recited in claim 1 wherein the variable start-up circuit is applied to all switching regulators without regard to architectures, topologies, and schematics.

* * * * *